(12) United States Patent
Glück et al.

(10) Patent No.: US 6,362,242 B1
(45) Date of Patent: Mar. 26, 2002

(54) METHOD FOR PRODUCING EXPANDABLE STYRENE POLYMERS

(75) Inventors: Guiscard Glück, Mainz; Klaus Hahn, Kirchheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/508,686

(22) PCT Filed: Sep. 8, 1998

(86) PCT No.: PCT/EP98/05684

§ 371 Date: Mar. 28, 2000

§ 102(e) Date: Mar. 28, 2000

(87) PCT Pub. No.: WO99/16817

PCT Pub. Date: Apr. 8, 1999

(30) Foreign Application Priority Data

Sep. 29, 1997 (DE) .......................... 197 42 910

(51) Int. Cl.$^7$ ........................... C08J 9/16; C08F 257/02
(52) U.S. Cl. ........................ 521/56; 521/146; 524/425; 524/577
(58) Field of Search ................... 521/56, 146; 524/425, 524/577

(56) References Cited

U.S. PATENT DOCUMENTS 4,731,388 A * 3/1988 Matsui .......................... 521/56
5,679,718 A * 10/1997 Suh et al. ...................... 521/53

FOREIGN PATENT DOCUMENTS

| GB | 1048865 | * | 11/1966 | ........... C08F/47/10 |
| JP | 58036450 | * | 3/1983 | ........... B32B/19/02 |

* cited by examiner

*Primary Examiner*—David W. Wu
*Assistant Examiner*—Kelechi Egwim
(74) *Attorney, Agent, or Firm*—Oblon, Spivak, McClelland, Maier & Neustadt, P.C.

(57) ABSTRACT

Expandable styrene polymers containing graphite particles are prepared by polymerizing styrene in aqueous suspension in the presence of graphite particles and of two peroxides which decompose at different temperatures, by a process in which the peroxide decomposing at the lower temperature forms neither benzoyl nor benzyl radicals on decomposition.

7 Claims, No Drawings

METHOD FOR PRODUCING EXPANDABLE STYRENE POLYMERS

The present invention relates to a process for the preparation of expandable styrene polymers (EPS) having reduced thermal conductivity.

Polystyrene particle foams have long been known and have proven useful in many areas. Such foams are prepared by expansion of polystyrene particles impregnated with blowing agents and subsequent welding of the resulting foam particles to give moldings. An important field of use is heat insulation in the building trade.

The polystyrene particle foam panels used for heat insulation generally have densities of about 30 g/l since the thermal conductivity of the polystyrene particle foam is lowest at these densities. In order to save material or to save space, it would be desirable to use foam panels of lower densities, in particular ≦15 g/l, for heat insulation. The preparation of such foams presents no problem technically. However, foam panels with such a low density have a dramatically poorer heat insulation capacity so that they do not meet the requirements of thermal conductivity class 035 (DIN 18 164, part 1).

It is known that the thermal conductivity of foams can be reduced by incorporating athermanous materials, such as carbon black, metal oxides, metal powders or pigments. Patent application PCT/EP 97/02457 proposes using graphite as the athermanous material. This patent application also describes in detail a process for the preparation of EPS containing graphite particles, in which styrene is polymerized in aqueous suspension in the presence of the graphite particles. In the examples, a combination of dicumyl peroxide and dibenzoyl peroxide is used as polymerization initiators. In scaling up the process, however, problems were encountered with the removal of the heat of reaction and coagulation was found to occur in some cases.

It is an object of the present invention to provide a simple process, which can be carried out without problems, for the preparation of EPS by suspension polymerization of styrene in the presence of graphite particles.

We have found that this object is achieved by a process for the preparation of expandable styrene polymers, in which styrene, if required together with up to 20% of its weight of comonomers, is polymerized in aqueous suspension in the presence of from 0.1 to 25% by weight of graphite particles and of at least two organic peroxides A and B which decompose at different temperatures, the peroxide A decomposing at the lower temperature forming neither benzoyl nor benzyl radicals on decomposition.

EP-A 488 040 describes a process for the preparation of benzene-free EPS, in which styrene is polymerized in aqueous suspension in the presence of two organic peroxides which decompose at different temperatures. The peroxide decomposing at the higher temperature should be free of benzoyl groups, dicumyl peroxide being preferred. The peroxide decomposing at the lower temperature is preferably dibenzoyl peroxide, ie. a peroxide which forms benzoyl radicals on decomposition and which gives rise to the problems described above. Tert-butyl peroxy-2-ethylhexanoate is also mentioned. At no point in the publication, however, is there any mention of the addition of graphite for reducing the thermal conductivity of the foams, and there is absolutely no discussion of the problems which occur in the polymerization in the presence of graphite.

Expandable styrene polymers are understood as meaning styrene polymers containing blowing agents.

The novel EPS contains, as a polymer matrix, homopolystyrene or styrene copolymers with up to 20% by weight, based on the weight of the polymers, of ethylenically unsaturated comonomers, in particular alkylstyrenes, divinylbenzene, acrylonitrile or α-methylstyrene.

In the novel suspension polymerization, the conventional assistants, for example suspension stabilizers, blowing agents, chain transfer agents, expansion assistants, nucleating agents and plasticizers may be added. The addition of flameproofing agents, preferably in amounts of from 0.6 to 6% by weight, and of synergistic flameproofing agents in amounts of from 0.1 to 1% by weight, based in each case on the resulting styrene polymer, is particularly preferred. Preferred flameproofing agents are aliphatic, cycloaliphatic and aromatic bromine compounds, such as hexabromocyclododecane, pentabromomonochlorocyclohexane and pentabromophenyl allyl ether. Suitable synergistic agents are C—C or O—O labile organic compounds, such as dicumyl and dicumyl peroxide. Blowing agents are added in amounts of from 3 to 10% by weight, based on styrene polymer. They may be added before, during or after the polymerization of the suspension. Suitable blowing agents are aliphatic hydrocarbons of 4 to 6 carbon atoms. It is advantageous to use inorganic Pickering dispersants, eg. magnesium pyrophosphate or calcium phosphate, as suspension stabilizers.

The graphite used preferably has an average particle size of 1–50 μm, in particular 2.5–12 μm, a bulk density of 100–500 g/l and a specific surface area of 5–20 m²/g. Natural graphite or synthetic graphite may be used.

In the novel suspension polymerization, the graphite particles are added in amounts of from 0.1 to 25, in particular from 2 to 8, % by weight, based on the resulting styrene polymer. They are employed either in powder form or as a granular masterbatch in polystyrene. It is also possible in principle to add the graphite particles in the course of the suspension polymerization, preferably during the first half of the polymerization cycle.

According to the invention, the suspension polymerization is carried out in the presence of at least two peroxides which decompose at different temperatures. The peroxide A decomposing at the lower temperature should have a half-life of 1 hour at from 80 to 100° C., preferably from 85 to 95° C.; the peroxide B decomposing at the higher temperature should have a half-life of 1 hour at from 110 to 140° C., preferably from 120 to 135° C. According to the invention, the peroxide A must not form any benzoyl or benzyl radicals on decomposition. These are evidently directly or indirectly responsible for the problems occurring with the use of dibenzoyl peroxide. Preferred peroxides A are those which form alkoxy radicals on decomposition. Examples are tert-butyl peroxy-2-ethylhexanoate, amyl peroxy-2-ethylhexanoate, tert-butyl peroxydiethylacetate and tert-butylperoxyisobutanoate. Peroxide A is preferably employed in amounts of from 0.01 to 0.5 % by weight, in particular of from 0.03 to 0.2 % by weight, based on the monomers.

In principle, all conventional peroxides decomposing at the stated high temperatures may be used as peroxide B. However, those which are free of benzoyl groups are preferred if the resulting EPS is to be benzene-free. Preferred peroxides B are therefore dicumyl peroxide and the aliphatic or cycloaliphatic perketals or monoperoxycarbonates, which are mentioned in EP-A 574 665. Peroxide B is preferably employed in amounts of from 0.1 to 2.0 % by weight, in particular of from 0.3 to 1.0 % by weight, based on the monomers.

In addition to the peroxides A and B, it is possible in principle to add further peroxides, which should however fulfill the abovementioned conditions, depending on their decomposition temperature.

The suspension polymerization is advantageously carried out—as described in EP-A 405 324—in two temperature steps. First, the suspension is heated to 80–90° C. in the course of not more than 2 hours, the peroxide A decomposing and initiating the polymerization. The reaction temperature is then allowed to increase, preferably by from 8 to 17° C. per hour, to 100–130° C. and this temperature is maintained until the residual monomer content has decreased to less than 0.1%. At this temperature, the peroxide B decomposes. This procedure makes it possible to produce EPS having low residual monomer contents. The use of peroxides having different half-lives as a function of the temperature permits controlled removal of the heat of reaction over the entire process. This is particularly important for large reaction vessels as used in industrial production, which have an unfavorable volume/surface area ratio for heat removal.

It has been found that it is advantageous for the stability of the suspension if a solution of polystyrene (or a corresponding styrene copolymer) in styrene (or a mixture of styrene with comonomers) is present at the beginning of the suspension polymerization. A 0.5–30, in particular 3–20, % strength by weight solution of polystyrene in styrene is preferably used. Fresh polystyrene may be dissolved in monomers, but it is advantageous to use boundary fractions which are removed as beads which are too large or too small by sieving in the separation of the bead spectrum obtained in the preparation of expandable polystyrene. In practice, such boundary fractions which cannot be used have diameters greater than 0.2 mm or less than 0.2 mm. Recycled polystyrene and recycled polystyrene foam may also be used. Another possibility is to prepolymerize styrene by mass polymerization to a conversion of from 0.5 to 70% and to suspend the prepolymer together with the graphite particles in the aqueous phase and complete the polymerization.

Bead-like, essentially round particles which have an average diameter of from 0.2 to 2 mm and in which the graphite particles are homogeneously distributed are formed in the suspension polymerization. They can be coated with the conventional coating materials, for example metal stearates, glyceryl esters and finely divided silicates.

The expandable styrene polymers containing graphite particles can be processed to give polystyrene foams having densities of from 5 to 35, preferably from 8 to 25, in particular from 10 to 15, g/l.

For this purpose, the expandable particles are pre-expanded. This is generally done by heating the particles with steam in pre-expanders.

The particles pre-expanded in this manner are then welded to give moldings. For this purpose, the pre-expanded particles are introduced into molds which do not close gas-tight and are treated with steam. After cooling, the shaped articles can be removed.

EXAMPLE 1 (Comparison)

21 kg of polystyrene (PS 158 K from BASF) are dissolved in 419 kg of styrene, and 8.5 kg of graphite powder (Graphitwerk Kropfmühl AG, AF) are homogeneously suspended therein while admixing 0.21 kg of dibenzoyl peroxide, 2.1 kg of dicumyl peroxide and 2.9 kg of hexabromocyclododecane. The organic phase is introduced into 485 l of demineralized water in a pressure-resistant 1 m$^3$ stirred kettle. The aqueous phase contains 1.16 kg of sodium pyrophosphate and 2.15 kg of magnesium sulfate. The reaction mixture is heated rapidly to 90° C. with stirring. It is then heated to 125° C. in the course of 4 hours, 5.8 kg of emulsifier K 30/40 (Bayer AG) being added after 2 hours and 30 kg of pentane after about 2.5 hours. Finally, polymerization is completed at 125° C.

EXAMPLE 2 (Comparison)

Similarly to Example 1, but 0.42 kg of dibenzoyl peroxide instead of 0.21 kg of dibenzoyl peroxide.

EXAMPLE 3 (Comparison)

Similarly to Example 1, but no dibenzoyl peroxide.

EXAMPLE 4

Similarly to Example 1, but 0.34 kg of tert-butyl peroxy-2-ethylhexanoate (half-life 1 hour at 91° C.) instead of dibenzoyl peroxide.

EXAMPLE 5

Similarly to Example 1, but 0.25 kg of tert-butyl peroxy 2-ethylhexanoate instead of dibenzoyl peroxide.
Results:

In Examples 1 to 3, it is observed that heat must still be supplied to the reaction vessel from the outside even after 90° C. has been reached. Only after a reaction temperature of more than 100° C. has been reached must heat be removed from the reaction vessel in order to maintain the predetermined temperature profile. However, a very large amount of heat is liberated in a short time, necessitating very considerable cooling. This would no longer be controllable on a large industrial scale, for example in a 50 m$^3$ kettle.

The observation in Examples 4 and 5, where tert-butyl peroxy-2-ethylhexanoate is used instead of dibenzoyl peroxide, is substantially different. Heat must be removed from the reaction vessel as soon as 90° C. has been reached, so that substantially less heat is liberated in the second stage and can be removed without problems even in the case of larger batches.

We claim:

1. A process for the preparation of expandable styrene polymers (EPS), in which styrene, optionally together with up to 20% of its weight of comonomers, is polymerized in aqueous suspension in the presence of from 0.1 to 25% by weight of graphite particles and of at least two organic peroxides A and B which decompose at different temperatures, the peroxide A having a half-life of 1 hour at from 80 to 100° C. and the peroxide B having a half-life of 1 hour at from 110 to 140° C., wherein the peroxide A decomposing at the lower temperature forms neither benzoyl nor benzyl radicals on decomposition.

2. A process for the preparation of EPS as claimed in claim 1, wherein the peroxide A is employed in amounts of from 0.01 to 0.5% by weight and the peroxide B in amounts of from 0.1 to 2.0% by weight, in each case based on the monomers.

3. A process for the preparation of EPS as claimed in claim 1, wherein the peroxide A forms alkoxy radicals on decomposition.

4. A process for the preparation of EPS as claimed in claim 1, wherein the peroxide A is tert-butyl peroxy-2-ethylhexanoate.

5. A process for the preparation of EPS as claimed in claim 1, wherein the peroxide B is free of benzoyl groups.

6. A process for the preparation of EPS as claimed in claim 1, wherein the peroxide B is dicumyl peroxide.

7. A process for the preparation of EPS as claimed in claim 1, wherein a solution of polystyrene in styrene is used in the suspension polymerization.

* * * * *